US005252021A

United States Patent [19]

Thoor et al.

[11] Patent Number: 5,252,021

[45] Date of Patent: Oct. 12, 1993

[54] HANDLING INSTALLATION FOR IRON AND STEEL PRODUCTS

[75] Inventors: Henry-Albert Thoor, Villeneuve Sur Yonne; Jean-Claude Audebert, Evry; Yves Braud, Maurepas, all of France

[73] Assignee: Stein-Heurtey, Ris Orangis, France

[21] Appl. No.: 926,193

[22] Filed: Aug. 7, 1992

Related U.S. Application Data

[63] Continuation of Ser. No. 621,884, Dec. 4, 1990, abandoned.

[51] Int. Cl.[5] .............................................. B65G 65/00

[52] U.S. Cl. .................................... 414/589; 414/341; 414/679

[58] Field of Search ............... 414/589, 591, 341, 284, 414/279, 277; 294/81.56, 81.51, 81.5; 191/29 R, 12 R, 191

[56] References Cited

U.S. PATENT DOCUMENTS

| | | | |
|---|---|---|---|
| 1,825,968 | 10/1931 | Mapson | 191/29 |
| 2,138,886 | 12/1938 | Schramm . | |
| 3,718,097 | 2/1973 | La Tourneau . | |
| 3,940,577 | 2/1976 | Christofer | 191/12 R |
| 4,505,630 | 3/1985 | Kaschner et al. . | |
| 4,599,033 | 7/1986 | Raz | 414/589 |
| 4,714,122 | 12/1987 | Appleton et al. | 414/21 X |
| 4,971,508 | 11/1990 | Miyahara et al. | 414/341 X |
| 5,054,986 | 10/1991 | Hirano et al. | 414/341 X |

FOREIGN PATENT DOCUMENTS

| | | | |
|---|---|---|---|
| 340628 | 9/1921 | Fed. Rep. of Germany . | |
| 1229131 | 11/1966 | Fed. Rep. of Germany . | |
| 2215252 | 10/1973 | Fed. Rep. of Germany . | |
| 2305790 | 8/1974 | Fed. Rep. of Germany . | |
| 3404893 | 8/1985 | Fed. Rep. of Germany . | |
| 8403359 | 11/1986 | Fed. Rep. of Germany . | |
| 2067371 | 8/1971 | France . | |
| 2143863 | 2/1973 | France . | |
| 971316 | 9/1964 | United Kingdom . | |
| 1073192 | 6/1967 | United Kingdom | 294/81.51 |

*Primary Examiner*—Michael S. Huppert
*Assistant Examiner*—Donald W. Underwood
*Attorney, Agent, or Firm*—Pollock, VandeSande & Priddy

[57] ABSTRACT

A system for handling iron and steel products, such as, in particular, slabs, blooms, billets and similar products, which have intersecting translation movements. These include apparatus for gripping, handling and transporting iron and steel products and adapted for being driven in a translation movement along a running path, and a transfer carriage on which the apparatus for gripping and carrying a product is positioned. The transfer carriage is capable of being displaced along a running path, according to a translation movement perpendicular to the translation movement of the gripping apparatus in order to bring the product to any desired location.

5 Claims, 2 Drawing Sheets

HANDLING INSTALLATION FOR IRON AND STEEL PRODUCTS

This is a continuation of copending application Ser. No. 07/621,884, filed on Dec. 4, 1990, now abandoned.

The present invention relates to a handling installation for iron and steel products which has intersecting translation movements. More particularly, it proposes to provide an installation which makes it possible to transport, to position and to introduce into a furnace iron and steel products such as, in particular, slabs, blooms or billets, either at a high temperature (of the order of 800° C.) or at the ambient temperature.

SUMMARY OF THE INVENTION

An installation according to this invention is essentially characterised in that it comprises:

a) means which make it possible to carry out the gripping, the handling and the transport of the iron and steel products, these means being driven in a translation movement along a running path, and b) a transfer carriage, on which the means of gripping, of handling and of transport carrying a product are positioned, this carriage being capable of being displaced on a running path, according to a translation movement perpendicular to the translation movement of said means, in order to bring said product to any desired location.

As can be understood, the iron and steel products to be handled are taken by the means of gripping and of transport, for example from a storage zone. They are then transported by these means on to the transfer carriage which, carrying the means of gripping and of transport, brings them by translation to any desired location, for example in front of a reheating furnace, into which they are introduced by said means of gripping and of transport.

According to an exemplary embodiment of the invention, the means of gripping, of handling and of transport of the iron and steel products comprise essentially: a principal beam, on which there are mounted fingers which pivot about a common axis and are designed so as to take hold of and raise the product, and two lateral carriages which are connected by said principal beam and are displaced on said running path under the effect of a drive mechanism constituted, for example, by a rack/pinion system which drives the driving wheels or rollers of said carriages and is actuated by electric or hydraulic geared-motor units.

According to an embodiment of this invention, the transfer carriage is constituted by a chassis which runs on rails by means of wheels or of rollers which are controlled by electric or hydraulic geared-motor units, this transfer carriage being provided on its upper surface with a section of running path, in continuation of the running path of the means of gripping and of transport of the products, so that the means carrying the products are positioned there as if by running on said section, to be directed then by said transfer carriage along the running path of this latter, which is perpendicular to the running path of said means of gripping and of transport.

BRIEF DESCRIPTION OF THE DRAWINGS

Other characteristics and advantages of this invention will emerge from the description given below with reference to the attached drawings which illustrate an exemplary embodiment thereof, which has no limitative nature. In the drawings.

DETAILED DESCRIPTION OF THE INVENTION

Figure 1:
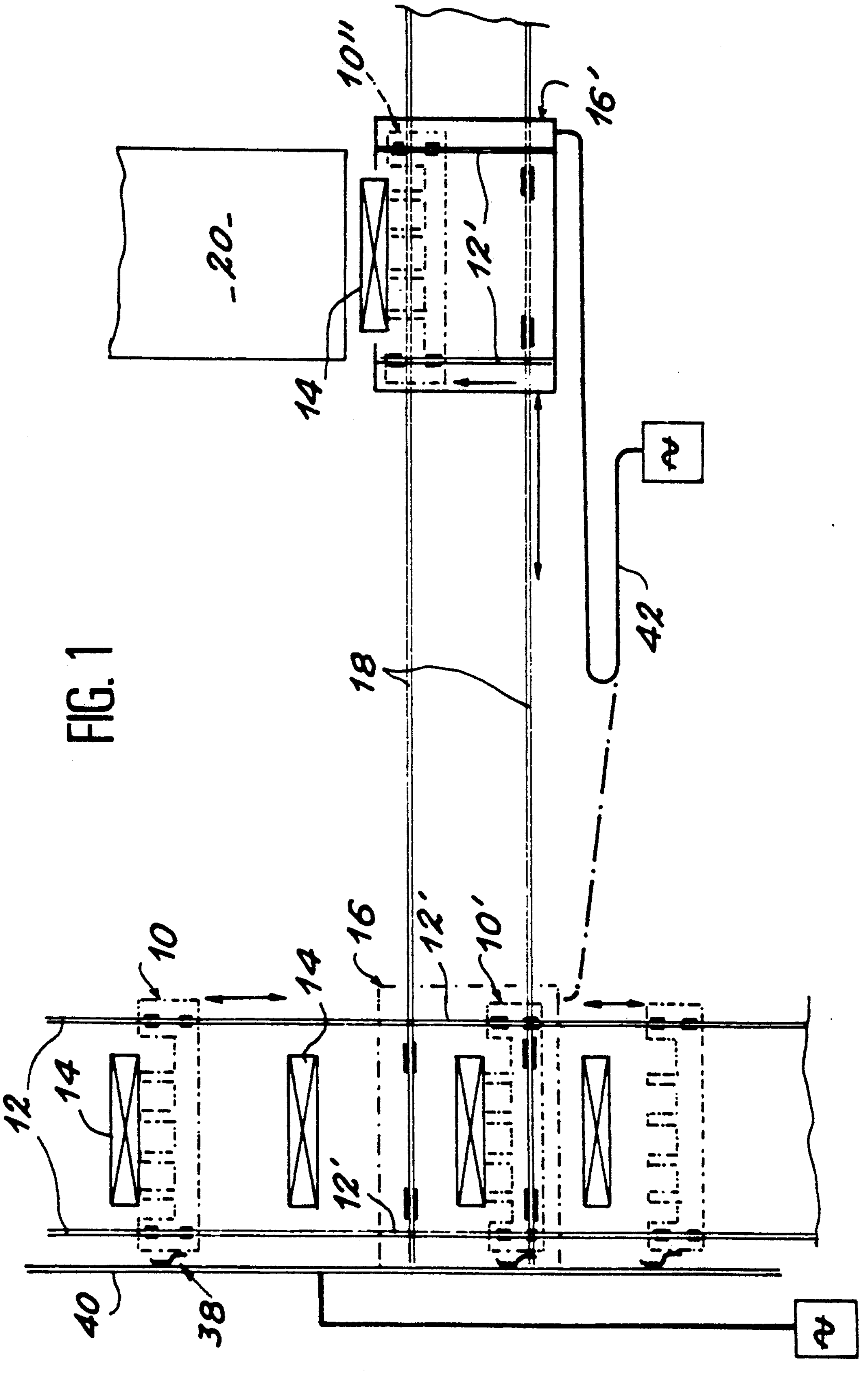
FIG. 1 is a schematic plan view of an installation according to the invention.

With reference to the drawings, and in particular to FIG. 1, it can be seen that the installation according to the invention comprises essentially two elements:

means of gripping, of handling and of transport, designated as a whole by the reference 10, which can be displaced by a translation movement along a running path 12, take hold of and subsequently transport products 14, for example slabs, blooms or billets;

a transfer carriage, designated as a whole by the reference 16, which is designed so as to receive the means of gripping, of handling and of transport 10, with the iron and steel products 14 which they support, and which can be displaced along a running path 18 which is perpendicular to the running path 12 of the means 10.

As can be seen in FIG. 1, in this non-limitative example of implementation the installation is designed in such a manner that the means 10 come to take a product 14 from a storage zone, to transport it then, by means of the carriage 16, to a furnace 20 into which it is introduced, the storage zone being situated to the side of the furnace.

Figure 2:
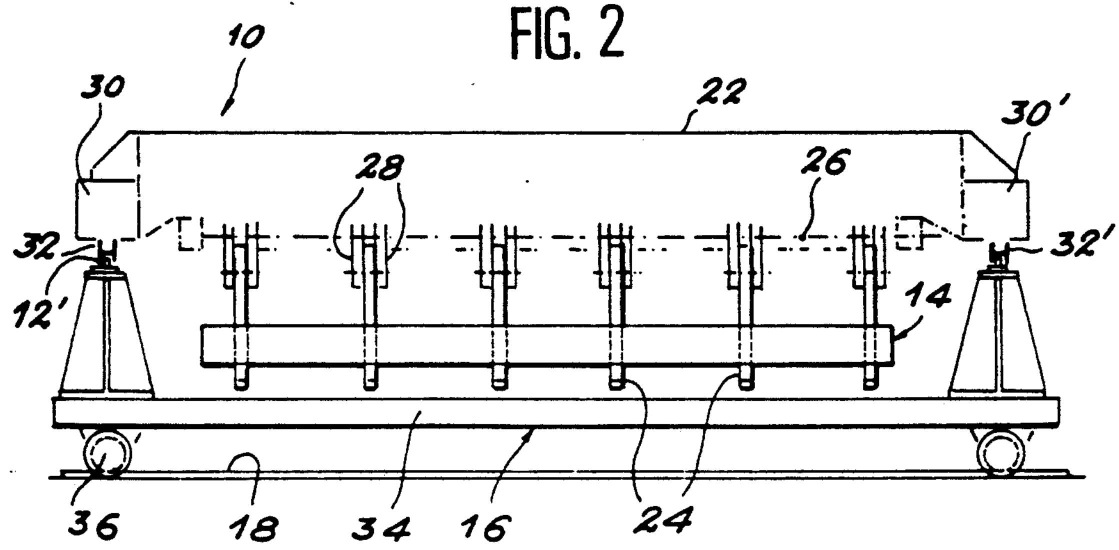
FIG. 2 is a view in front elevation of the transfer carriage carrying the means of gripping, of handling and of transport of the iron and steel products.
Figure 3:
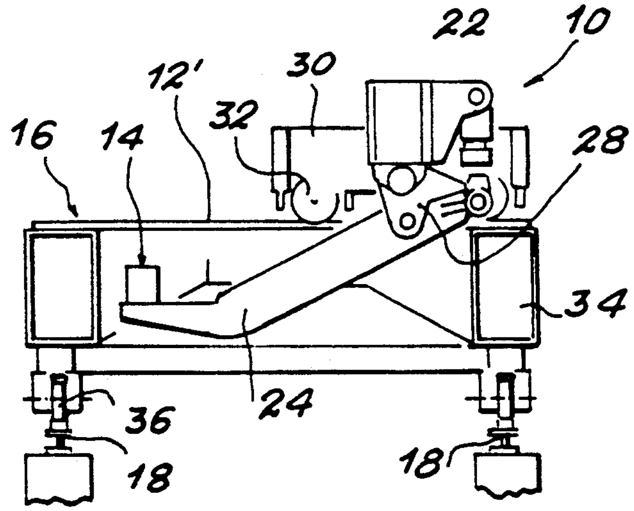
FIG. 3 is a view in lateral elevation of FIG. 2.

In this embodiment (FIGS. 2 and 3), the means 10 of gripping, handling and transport comprise essentially:

a principal beam 22 supporting a plurality of fingers such as 24 which pivot about a common axis 26 and carry out the gripping and the handling of the products 14, by raising these latter. The rotation of the fingers 24 about the axis 26 can be achieved with the aid of pneumatic or hydraulic jacks supplied, for example, by a power unit mounted on the device 10. The jacks act on levers such as 28 connected to each finger 24. Any other means can, of course, be provided for the control of the gripping fingers, in particular screw jacks and similar means.

two lateral carriages 30, 30' provided with wheels or with rollers such as 32, 32', which are displaced on the running path 12 (FIG. 1) which is consituted preferably by rails. The drive of the carriages 30, 30' can be achieved with the aid of a rack/pinion system (not represented in the drawing), the rails and the rack being placed on the ground for the section situated in the storage zone and mounted (part 12') on the transfer carriage 16 for the transfer section. The translation movement of the lateral carriages 30, 30' by means of the rack/pinion system can be carried out by electric or hydraulic geared-motor units or by any other means of conventional type.

The transfer carriage 16 is constituted essentially by a chassis 34 which is provided with wheels or with rollers such as 36 and which can be displaced on rails 18. As has been mentioned above, the carriage 16 comprises the section of rails 12' which is intended to receive the means 10 at the time of the transfer towards the furnace 20. In the case of handling of a hot product, it is possible to have supports 50 mounted on the transfer carriage. In addition to supporting the product(s) during the transfer of the carriage, these supports can make it possible to carry out alignment operations or other measures such as weighing and width measurement.

The transfer carriage 16 can be displaced translationally by any appropriate means, for example by electric or hydraulic geared-motor units.

In the case in which the control of the translation movements is brought about electrically, the electric supply can be brought about in the manner represented schematically in FIG. 1, that is to say by a shoe 38 and rail 40 system as far as the means 10 are concerned and by a collector system 42 as far as the carriage 16 is concerned.

The means 10 can of course be designed so as to be capable of passing, if necessary, above the stored products.

The handling and the transfer of the products 14 from the storage zone to the furnace 20 take place in the following manner.

The products 14 have been deposited in advance in the storage zone, for example with the aid of a crane which has positioned them in well-defined places, guaranteeing them the best possible alignment. However, this alignment is not perfect and the means 10 described above are to carry out successively the following functions:

pushing back slightly the product(s) (charging arrangement having a number of rows) to be transported in order to bring about correct alignment;

raising the product(s) with the aid of the fingers 24 (position 10, FIG. 1);

transporting the product thus taken hold of to the zone in which the transfer carriage 16 is situated, passing, if necessary, above the other stored products, and coming to be positioned (position 10', FIG. 1) on this transfer carriage 16, the wheels or rollers 32, 32' of the means 10 passing from the part 12 of the running path to the section 12' carried by the transfer carriage 16.

Since the product(s) 14 is (are) still carried by the means 10 which are themselves positioned on the transfer carriage 16 or is (are) placed on the supports 50, the carriage is displaced along the running path 18 in order to position the product(s) transported in front of the furnace 20 (position 16' of the transfer carriage).

According to the invention, the positioning of the products such as 14, which is carried out according to a charging arrangement (centering operation), is brought about with the aid of the transfer carriage 16 by using any usual technique such as, in particular, a laser, a pulse counter etc.

When the positioning operation is completed, the means 10 carry out the introduction of a product into the furnace 20 as soon as the charging authorization is given. To this end, and as has been represented in FIG. 1, the means 10 are displaced (position 10") along the section 12' of the running path, perpendicularly to the translation movement of the carriage 16 and the fingers 24 lower the product onto the andirons of the furnace 20.

Among the technical advantages and effects which are afforded by the installation, which is the subject of the invention and is described above, in comparison with conventional installations, mention can be made in particular of:

the possibility of retrieving products directly from a storage zone and of bringing them to any desired location, for example of introducing them into a furnace;

the possibility of aligning the products in the storage zone;

the possibility of positioning the products according to a predetermined charging arrangement without using roller tables;

the possibility of charging products without great friction;

a simplification and a reduction of investment in the zone concerned (in particular by virtue of the elimination of the roller tables);

great flexibility of utilisation;

the possibility of working with a number of rows of products (handling of a number of products);

the possibility of depositing the products on supports during the transfer; and the possibility of making use of these supports for carrying out an alignment or other measures.

Lastly, as for similar installations of conventional type, the installation according to the invention makes it possible to measure the width of the products by virtue of adapted sets of cells.

It is of course understood that this invention is not limited to the exemplary embodiments described and/or represented here, but that it includes all alternatives thereof.

What is claimed is:

1. A system for moving steel products in first and second intersecting directions comprising:

I first track means for moving said steel products in said first direction;

II second track means for moving said steel products in said second direction;

III steel product handling means for gripping and supporting said steel products, said handling means comprising:

(a) first and second spaced-apart side carriage means having wheels or rollers adapted for running on said first track means;

(b) main beam means for fixedly connecting said first and second side carriage means with each other;

(c) a plurality of parallel, spaced-apart laterally-extending fingers for supporting steel products, each of said fingers having a fixed end portion and a free end portion, said fixed end portions being horizontally offset from said free end portions;

(d) pivot means secured to said main beam and attached to said fingers for pivotally supporting said fingers at their fixed end portions on a common horizontal axis for movement of said free end portions when said fingers are caused to pivot, said common horizontal axis being located adjacent one end of said first and second carriage means, said fingers being cantilevered from said pivot means, whereby said free end portions move substantially vertically for gripping, raising, supporting, lowering and releasing said steel products when said fingers are caused to pivot about said horizontal axis; and, (e) finger actuation means mounted between said fingers and said main beam for causing said fingers to pivot about said common axis and move said free end portions vertically; and, IV transfer carriage means for supporting and moving said steel product handling means on said second track means in said second direction, said transfer carriage means comprising:

(a) frame means;

(b) wheel means supported by said frame means for rolling on said second track means; and, (c) third track means supported by an upper portion of said frame means for supporting said steel product handling means for movement thereby along said second track means, said third track means positioned for alignment with said first track means for moving said steel product handling means from support by said first track means to support by said third track means.

2. A system according to claim 1 including a source of power for moving said steel product handling means along said first track means.

3. A system according to claim 2 wherein said source of power comprises an electric power source, and a shoe and rail system for transferring electric power to said steel product handling means.

4. A system according to claim 1 including a source of power for moving said transfer carriage means along said second track means.

5. A system according to claim 4 wherein said source of power comprises an electric power source and a collector system for transferring electric power to said transfer carriage means.

* * * * *